(12) United States Patent
Smiddy et al.

(10) Patent No.: US 11,242,764 B2
(45) Date of Patent: Feb. 8, 2022

(54) SEAL ASSEMBLY WITH BAFFLE FOR GAS TURBINE ENGINE

(71) Applicant: United Technologies Corporation, Farmington, CT (US)

(72) Inventors: Winston Gregory Smiddy, Saco, ME (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 436 days.

(21) Appl. No.: 15/982,062

(22) Filed: May 17, 2018

(65) Prior Publication Data
US 2019/0353045 A1 Nov. 21, 2019

(51) Int. Cl.
*F01D 11/08* (2006.01)

(52) U.S. Cl.
CPC .......... *F01D 11/08* (2013.01); *F05D 2220/32* (2013.01); *F05D 2240/55* (2013.01)

(58) Field of Classification Search
CPC ........ F01D 11/08; F01D 11/005; F01D 11/24; F01D 25/12; F01D 25/246; F05D 2240/55; F05D 2240/126; F05D 2240/11; F05D 2220/32; F05D 2300/6033; F05D 2260/201; F05D 2250/294; F05D 2250/184; F05D 2250/182
See application file for complete search history.

(56) References Cited

U.S. PATENT DOCUMENTS

| | | | | |
|---|---|---|---|---|
| 4,222,707 A | * | 9/1980 | Drouet | F01D 11/08 415/116 |
| 4,303,371 A | * | 12/1981 | Eckert | F01D 11/08 415/116 |
| 5,127,793 A | * | 7/1992 | Walker | F01D 11/08 415/115 |

(Continued)

FOREIGN PATENT DOCUMENTS

WO 2015138027 9/2015

OTHER PUBLICATIONS

Partial European Search Report for European Patent Application No. 19175130.4 dated Nov. 8, 2019.

*Primary Examiner* — David E Sosnowski
*Assistant Examiner* — Hakeem M Abdellaoui
(74) *Attorney, Agent, or Firm* — Carlson, Gaskey & Olds, P.C.

(57) ABSTRACT

A seal assembly for a gas turbine engine according to an example of the present disclosure includes, among other things, a seal that has an elongated seal body having a seal face that bounds a gas path and an opposed impingement face. The seal body defines an internal cavity extending in a circumferential direction between opposed mate faces and extending in a radial direction between walls of the seal body defining the seal and impingement faces. A baffle divides the internal cavity into at least a first region and a second region. The first region has a first section extending transversely from a second section. The first section has a component in the radial direction, and the second section has a component in an axial direction such that the second region is defined between the baffle and the walls of the seal body defining the seal face. A method of sealing is also disclosed.

17 Claims, 7 Drawing Sheets

(56) References Cited

U.S. PATENT DOCUMENTS

| | | | | |
|---|---|---|---|---|
| 5,165,847 A * | 11/1992 | Proctor | F01D 11/08 | 415/115 |
| 7,665,953 B2 * | 2/2010 | Lee | F01D 11/24 | 415/1 |
| 7,740,444 B2 * | 6/2010 | Lee | F01D 11/24 | 415/173.1 |
| 8,052,381 B2 * | 11/2011 | Brunet | F01D 25/246 | 415/177 |
| 8,246,299 B2 * | 8/2012 | Razzell | F01D 11/005 | 415/173.1 |
| 8,784,037 B2 | 7/2014 | Durocher et al. | | |
| 8,814,507 B1 * | 8/2014 | Campbell | F01D 25/14 | 415/173.1 |
| 9,500,095 B2 * | 11/2016 | Pietrobon | F01D 11/24 | |
| 9,726,043 B2 | 8/2017 | Franks et al. | | |
| 10,337,346 B2 * | 7/2019 | McCaffrey | F01D 11/02 | |
| 10,364,706 B2 * | 7/2019 | McCaffrey | F01D 11/24 | |
| 10,634,010 B2 * | 4/2020 | Blaney | F01D 11/005 | |
| 2008/0131260 A1 | 6/2008 | Lee et al. | | |
| 2008/0206046 A1 * | 8/2008 | Razzell | F01D 11/005 | 415/173.1 |
| 2009/0104026 A1 * | 4/2009 | Dakowski | F01D 11/005 | 415/173.1 |
| 2013/0017060 A1 * | 1/2013 | Boswell | F01D 11/24 | 415/1 |
| 2016/0084101 A1 * | 3/2016 | McCaffrey | F01D 5/225 | 415/173.3 |
| 2016/0097303 A1 | 4/2016 | Baldiga et al. | | |
| 2016/0186605 A1 | 6/2016 | Briggs et al. | | |
| 2016/0215645 A1 * | 7/2016 | McCaffrey | F01D 11/08 | |
| 2016/0222812 A1 * | 8/2016 | Sippel | F01D 11/12 | |
| 2016/0319841 A1 * | 11/2016 | McCaffrey | F01D 25/12 | |
| 2017/0107852 A1 * | 4/2017 | Nasr | F01D 9/04 | |
| 2017/0175637 A1 | 6/2017 | Hughes et al. | | |
| 2019/0368366 A1 * | 12/2019 | Clark | F01D 11/08 | |
| 2020/0149477 A1 * | 5/2020 | Barker | F02C 7/28 | |
| 2021/0095571 A1 * | 4/2021 | Fernandez | C04B 35/83 | |
| 2021/0095573 A1 * | 4/2021 | Fernandez | C04B 35/565 | |
| 2021/0095574 A1 * | 4/2021 | Fernandez | C04B 35/622 | |

* cited by examiner

SEAL ASSEMBLY WITH BAFFLE FOR GAS TURBINE ENGINE

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds.

SUMMARY

A seal assembly for a gas turbine engine according to an example of the present disclosure includes a seal that has an elongated seal body having a seal face that bounds a gas path and an opposed impingement face. The seal body defines an internal cavity extending in a circumferential direction between opposed mate faces and extending in a radial direction between walls of the seal body defining the seal and impingement faces. A baffle divides the internal cavity into at least a first region and a second region. The first region has a first section extending transversely from a second section. The first section has a component in the radial direction, and the second section has a component in an axial direction such that the second region is defined between the baffle and the walls of the seal body defining the seal face.

In a further embodiment of any of the foregoing embodiments, the first region defines a first volume. The second region defines a second volume, and the first volume is less than half of the second volume.

In a further embodiment of any of the foregoing embodiments, the first section interconnects the second section and one or more inlet flow apertures defined by the seal body.

In a further embodiment of any of the foregoing embodiments, the second section interconnects the first section and one or more outlet flow apertures defined by the seal body.

In a further embodiment of any of the foregoing embodiments, the baffle is substantially free of any impingement holes such that the first region is fluidly isolated from the second region between the one or more inlet flow apertures and the one or more outlet flow apertures.

In a further embodiment of any of the foregoing embodiments, the first region includes a third section that extends transversely from the first section such that the third section has a component in the axial direction to interconnect the first section and the one or more inlet flow apertures, with the third section extending along walls of the seal body that define the impingement face such that the first region at least partially surrounds the second region.

In a further embodiment of any of the foregoing embodiments, a width of the first region varies at locations along the baffle in at least one of the circumferential direction and the axial direction.

In a further embodiment of any of the foregoing embodiments, the first section extends along walls of a leading edge region of the seal body that defines the internal cavity.

In a further embodiment of any of the foregoing embodiments, a pair of mounting blocks are insertable into respective openings along the mate faces to secure the seal to an engine static structure.

In a further embodiment of any of the foregoing embodiments, the first region includes outlet flow apertures along the mate faces.

In a further embodiment of any of the foregoing embodiments, the seal is made of a first material including a ceramic material, and the seal has a unitary construction.

In a further embodiment of any of the foregoing embodiments, the seal is a blade outer air seal (BOAS).

A gas turbine engine according to an example of the present disclosure includes an engine case extending along an engine axis, an array of blades rotatable about the engine axis, and an array of blade outer air seal assemblies distributed about the array of blades to bound a core flow path. Each of the seal assemblies includes a seal that has a seal body having a seal face that bounds the core flow path and an opposed impingement face. The seal body defines an internal cavity extending in a circumferential direction between opposed mate faces. The seal body defines at least one inlet flow aperture to the internal cavity. A baffle divides the internal cavity into at least a first region and a second region. The first region is defined between the baffle and walls of the seal body defining the seal face, and the at least one inlet flow aperture is defined along the first region.

In a further embodiment of any of the foregoing embodiments, the first region includes a first section extending from a second section. The first section has a component in a radial direction with respect to the engine axis, and the second section has a component in an axial direction with respect to the engine axis such that the second section is defined between the baffle and the walls of the seal body defining the seal face.

In a further embodiment of any of the foregoing embodiments, the engine case defines a plurality of cooling passages that communicate with a cooling source. Each of the plurality of cooling passages defines a passage axis that is oriented such that a projection of the passage axis intersects the impingement face of the seal body, and the at least one inlet flow aperture is defined along the impingement face.

A method of sealing of a gas turbine engine according to an example of the present disclosure includes securing a seal assembly to an engine static structure. The seal assembly has a seal and a baffle. The seal includes an elongated seal body having a seal face that bounds a gas path and an opposed impingement face. The seal body defines an internal cavity that extends in a circumferential direction between opposed mate faces. The baffle divides the internal cavity into at least a first region and a second region. The first region includes a first section extending transversely from a second section. The first section has a component in a radial direction, and the second section has a component in an axial direction such that the first region is defined between the baffle and walls of the seal body defining the seal face. The method includes communicating cooling flow from at least one inlet flow aperture to the first section, and then to the second section. At least one inlet flow aperture defined along the impingement face, and ejects the cooling flow from the second section into the gas path.

In a further embodiment of any of the foregoing embodiments, the first region includes a third section that extends transversely from the first section such that the third section has a component in the axial direction to interconnect the first section and the at least one inlet flow aperture. The third section extends along walls of the seal body that define the impingement face such that the first region at least partially surrounds the second region.

In a further embodiment of any of the foregoing embodiments, an end of the baffle abuts against the walls of the seal body defining the impingement face.

In a further embodiment of any of the foregoing embodiments, the step of ejecting the cooling flow includes ejecting the cooling flow from outlet flow apertures of the first region along the mate faces.

In a further embodiment of any of the foregoing embodiments, the engine static structure is an engine case that defines a plurality of cooling passages, and each of the plurality of cooling passages defines a passage axis that is oriented such that a projection of the passage axis intersects the impingement face.

The various features and advantages of this invention will become apparent to those skilled in the art from the following detailed description of an embodiment. The drawings that accompany the detailed description can be briefly described as follows.

The various features and advantages of this invention will become apparent to those skilled in the art from the following detailed description of an embodiment. The drawings that accompany the detailed description can be briefly described as follows.

DETAILED DESCRIPTION

Figure 1:
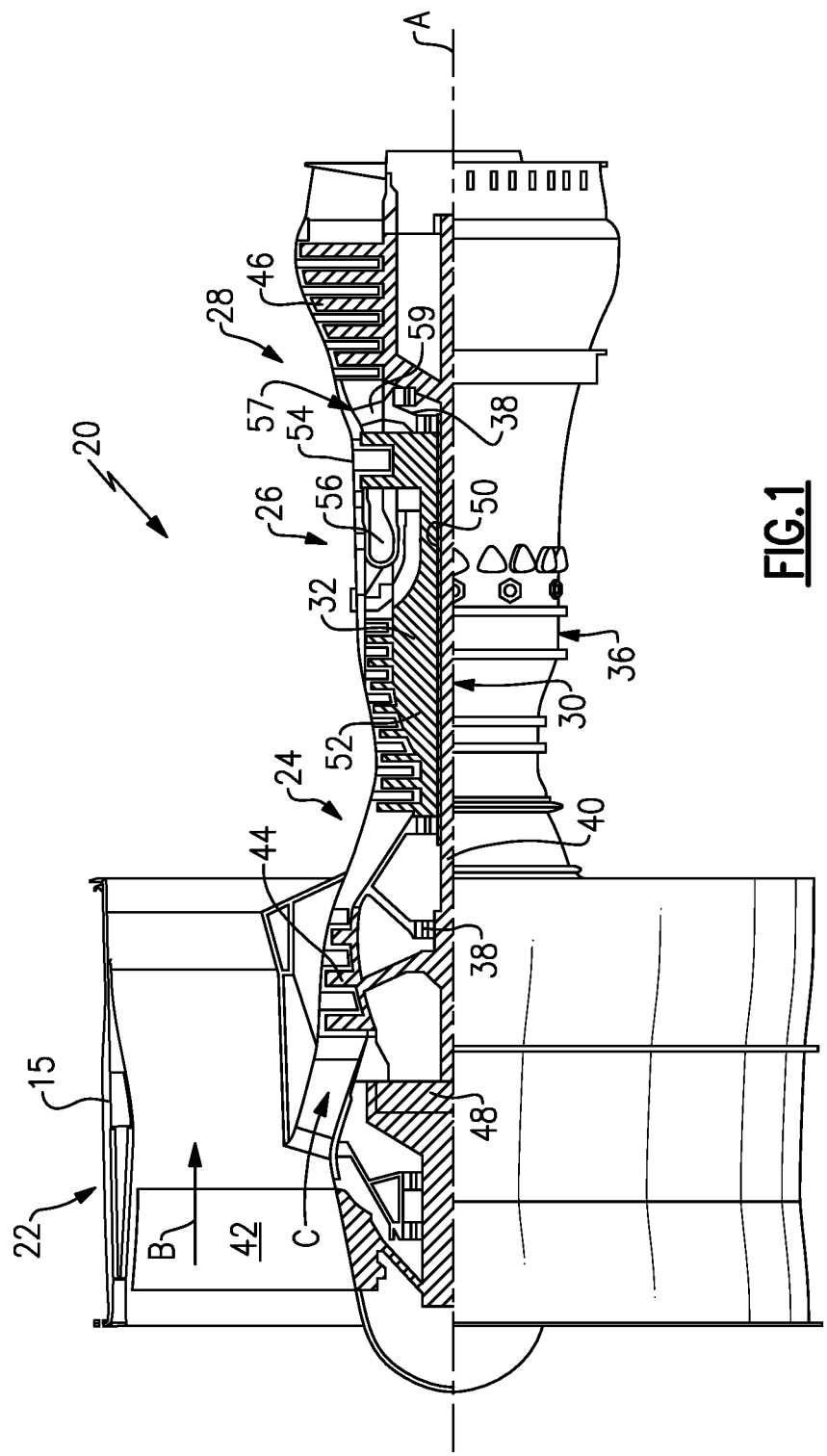
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
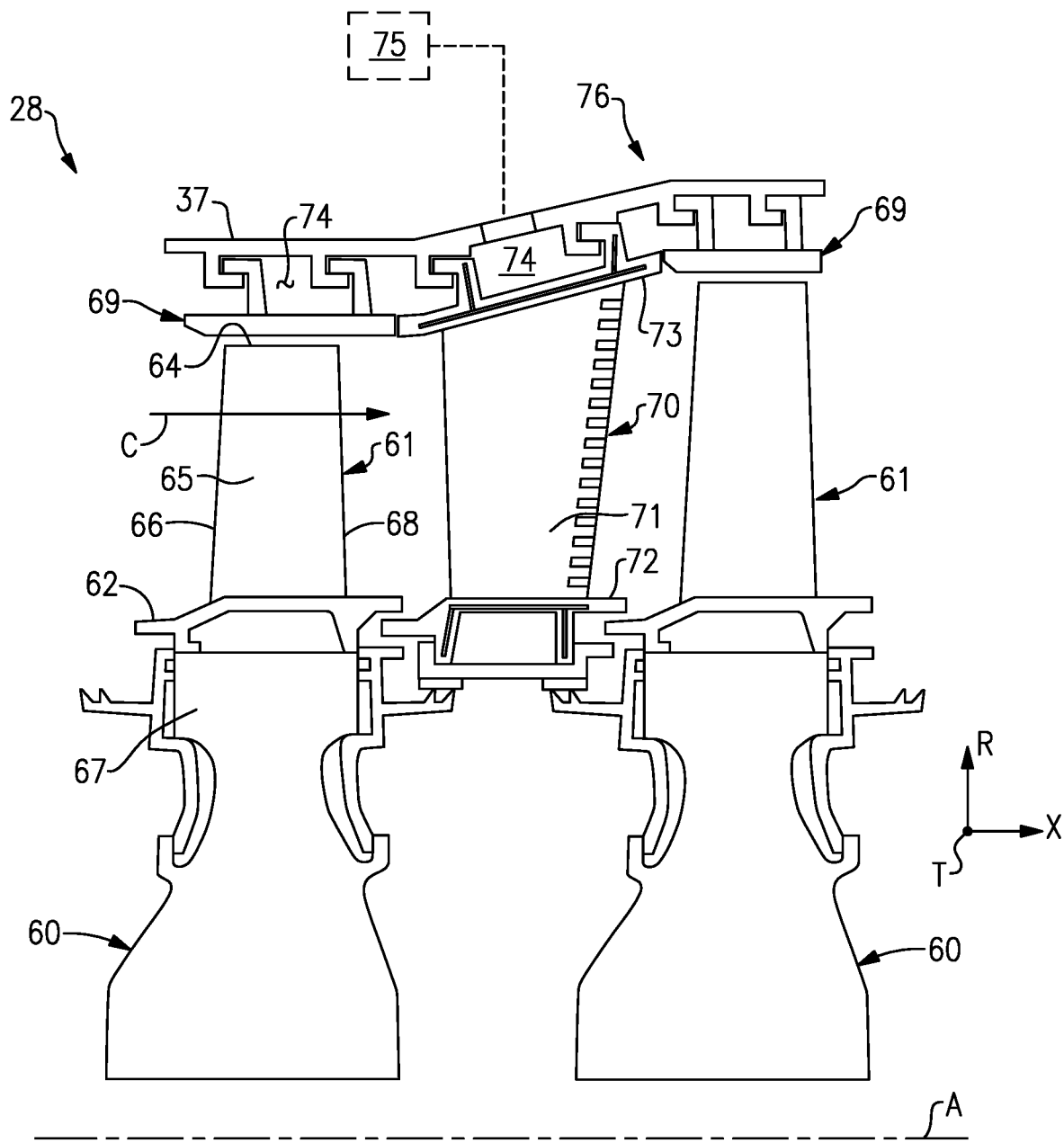
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 5 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that is redirected toward and over the rotating blade airfoil tips 64 through a corresponding clearance gap.

Figure 3:
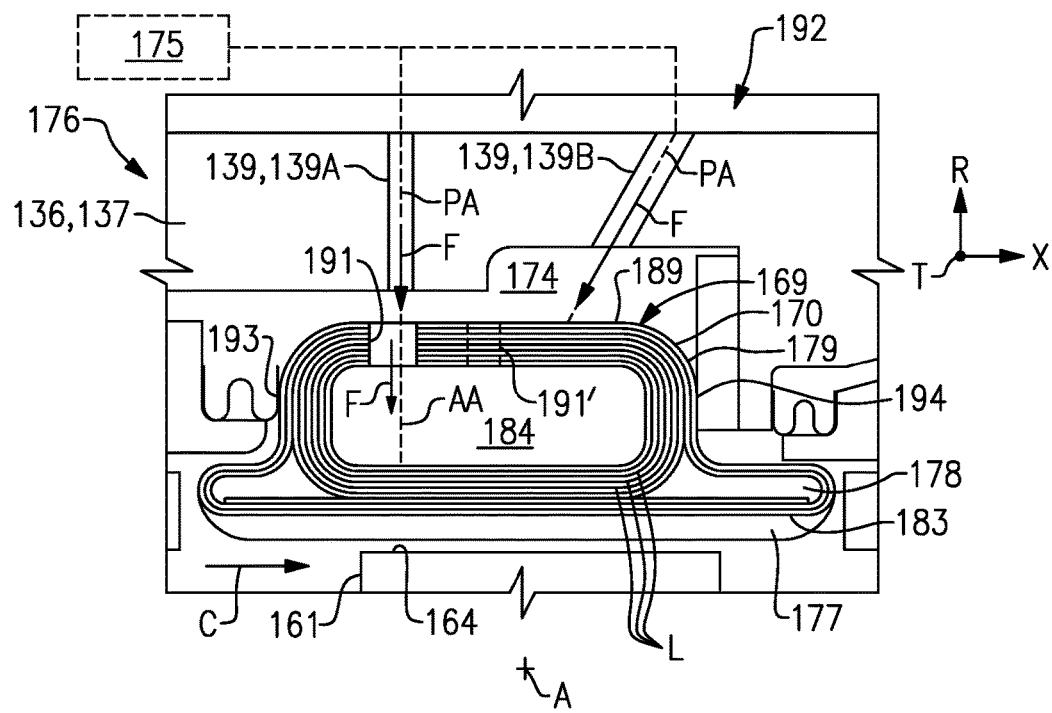
FIG. 3 illustrates a sectional view of a seal assembly including a seal.
Figure 4:
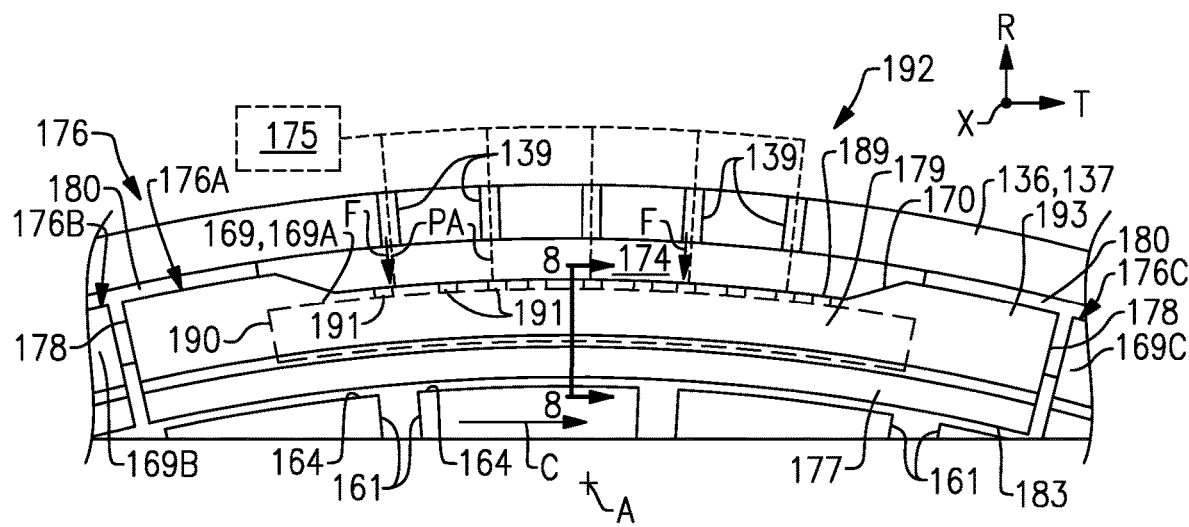
FIG. 4 illustrates an axial view of adjacent seal assemblies, including a baffle inserted into the seal of FIG. 3.
Figure 5:
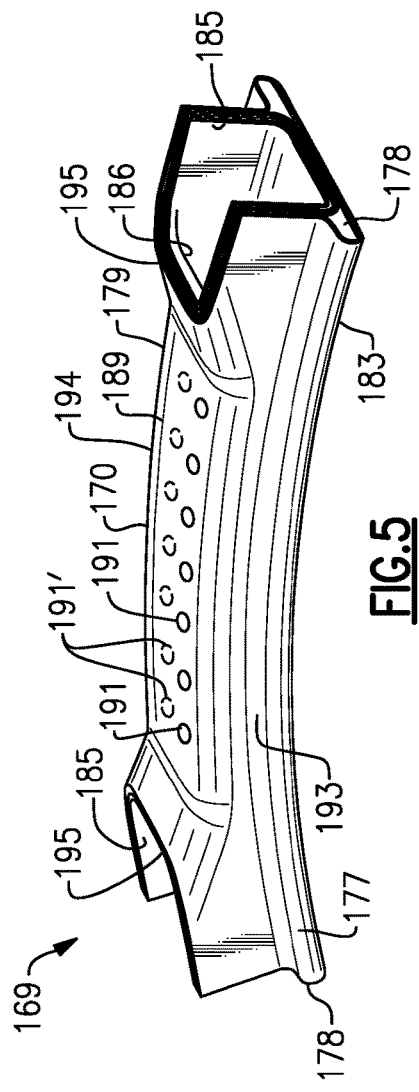
FIG. 5 illustrates an isolated perspective view of the seal of FIG. 3.
Figure 8:
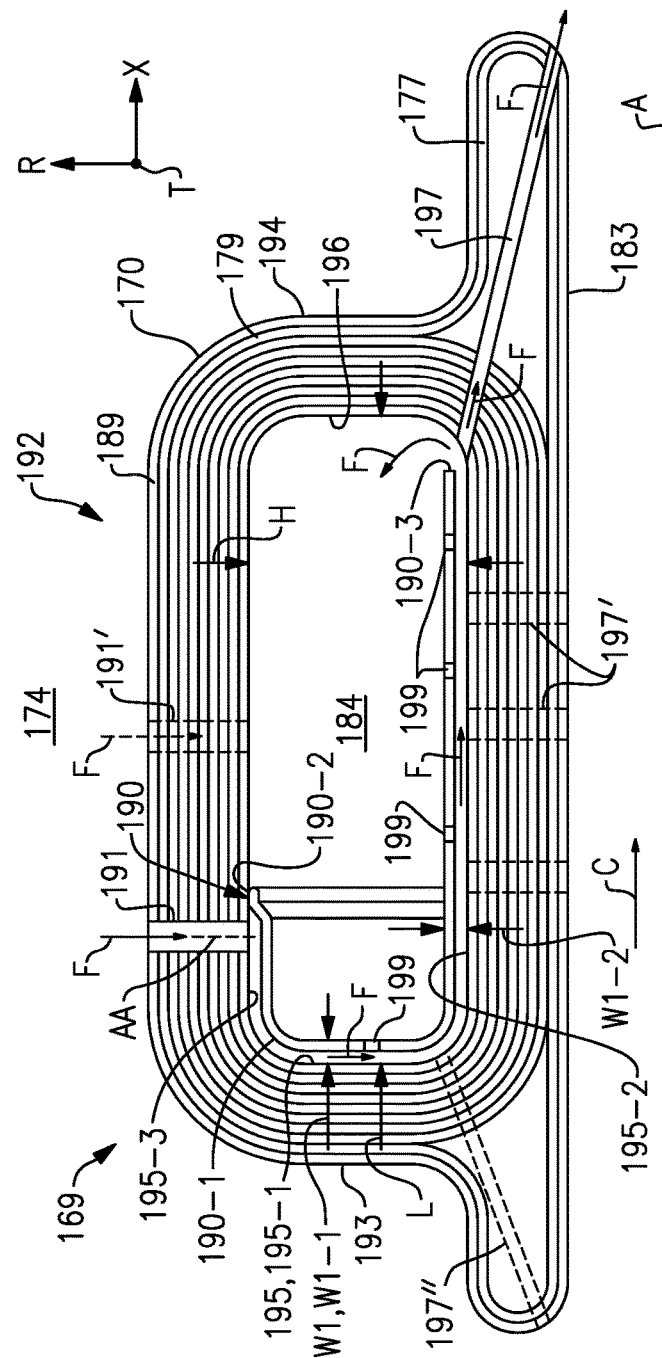
FIG. 8 illustrates a sectional view of the seal along line 8-8 of FIG. 4.
Figure 6:
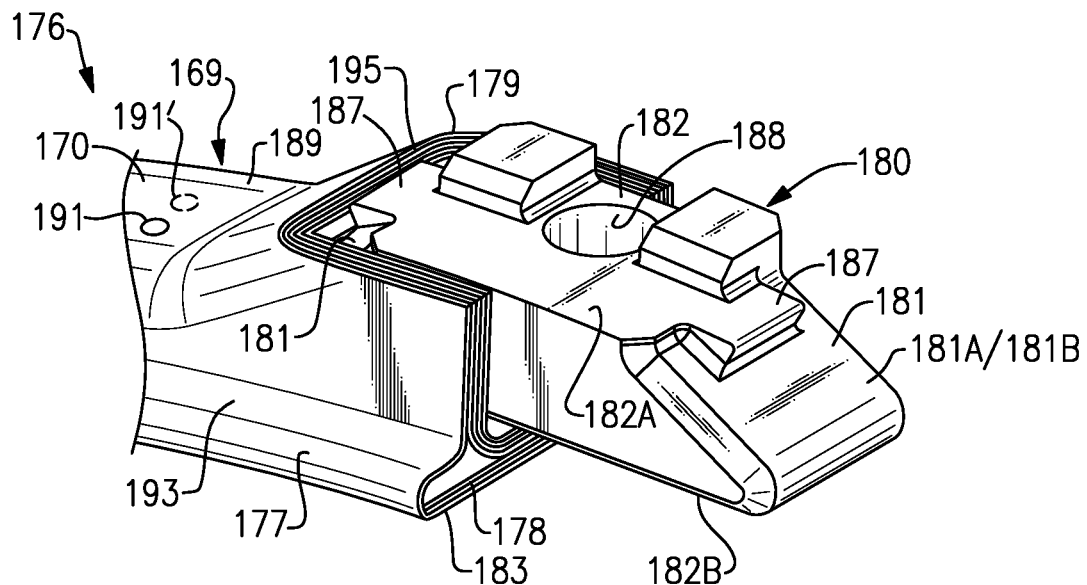
FIG. 6 illustrates a perspective view of a support inserted into the seal of FIG. 3.
Figure 7:
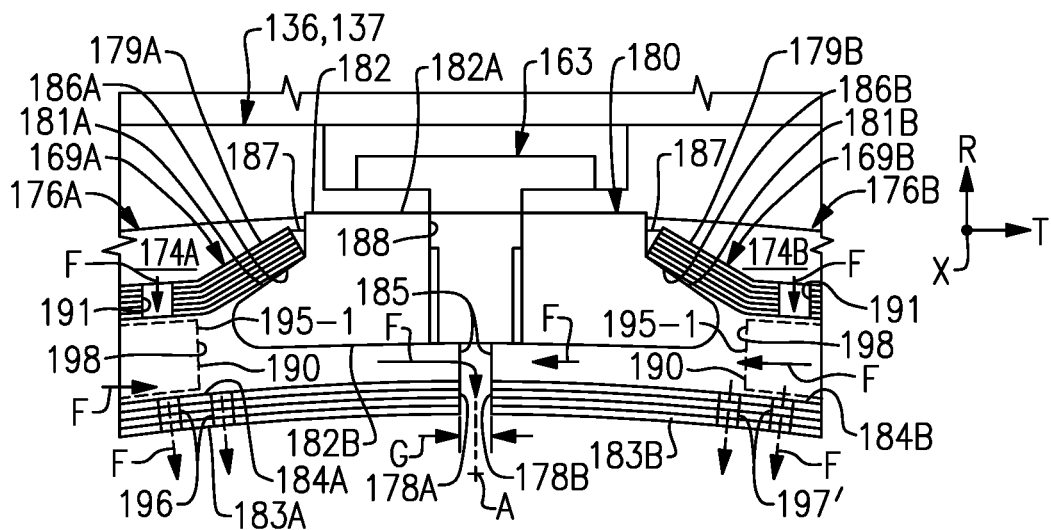
FIG. 7 illustrates a sectional view of the support of FIG. 6 between two adjacent seals.
Figure 9:
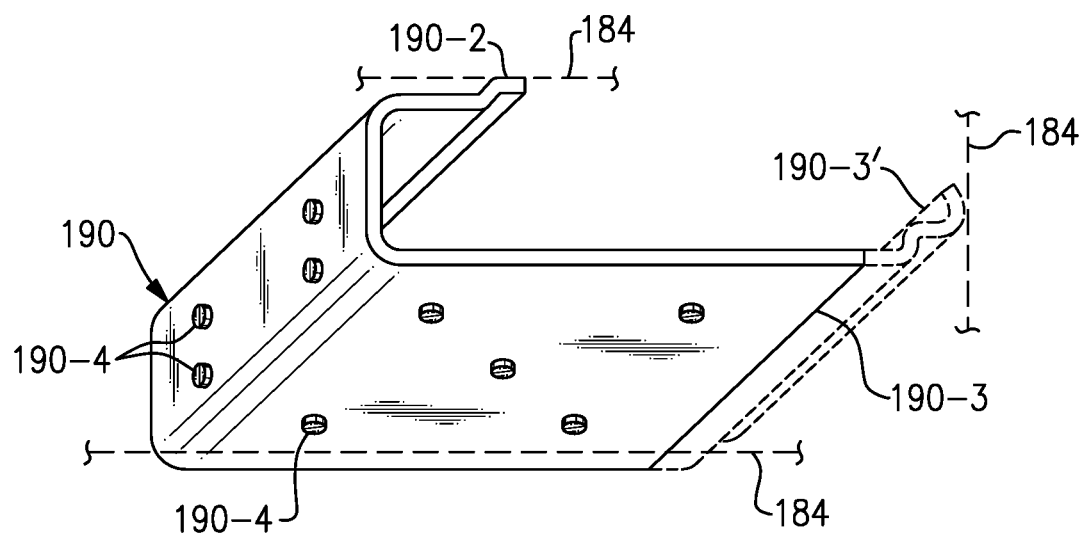
FIG. 9 illustrates an isolated perspective view of the baffle of FIG. 8.

FIGS. 3-9 illustrate an exemplary outer air seal case and support assembly 176 for sealing portions a gas turbine engine. The outer air seal case and support assembly 176 can be utilized for the seal assembly 76 of FIG. 2 or incorporated into a portion of the engine 20 of FIG. 1, for example. In the illustrated example of FIGS. 3-9, the outer air seal 169 is a blade outer air seal (BOAS). FIG. 3 is a sectional view of the outer air seal case and support assembly 176 in an installed position. FIG. 4 is an axial view of adjacent outer air seal case and support assemblies 176 (indicated as 176A, 176B, 176C), and including a space eater baffle 190 installed in the outer air seal 169 (shown in dashed lines). FIG. 5 illustrates a perspective view of the outer air seal 169. FIG. 6 illustrates a support or mounting block 180 of the outer air seal case and support assembly 176 inserted into the outer air seal 169. FIG. 7 illustrates a sectional view of the mounting block 180 between two adjacent outer air seals 169 (indicated as 169A, 169B). FIG. 8 illustrates a sectional view of the outer air seal 169 with the space eater baffle 190 installed in the outer air seal 169. FIG. 9 illustrates an isolated view of the example space eater baffle 190. The baffles described herein may be utilized for other applications related to inner diameter (ID) and outer diameter (OD) endwall cooling, as well as airfoil convective and/or convective-film cooled cooling design configurations, for example. Utilization of the baffle arrangements disclosed herein may be incorporated for any cooling design concept that requires cooling air flow redistribution and tailored convective cooling as well as total and static pressure management to provide outlet flow apertures with the required pressure ratio for improvements in both internal convective heat transfer and film cooling performance to mitigate in-plane and thru wall temperature gradients. Although the components discussed herein primarily refer to a BOAS in the turbine section 28, the teachings herein can also be utilized for other components of the engine 20, such as one of the platforms 62, 72, 73, an upstream stage of the compressor section 24, or combustor panels or liners defining portions of a combustion chamber located in the combustor section 26.

Referring to FIGS. 3-5, each outer air seal case & support assembly 176 includes an outer air seal 169, at least one support or mounting block 180 and at least one baffle 190 (shown in dashed lines in FIG. 4). Each outer air seal 169 is arranged in close proximity to an airfoil tip 164 during operation of the engine. An array of the outer air seals 169 is circumferentially distributed about axis A and about an array of blades or airfoils 161 to bound a core flow path C (three seals 169A-169C shown in FIG. 4 for illustrative purposes).

Each outer air seal 169 includes an elongated main (or seal) body 170 that extends in a circumferential direction T between opposed (or first and second) mate faces 178 which define the bounds of the intersegment gaps between adjacent outer air seals 169 (see, e.g., intersegment gap G of FIG. 7) and extends in an axial direction X between a leading edge portion 193 and a trailing edge portion 194. The main body 170 can have a generally elongated and arcuate profile, as illustrated by FIGS. 4 and 5. The outer air seal 169 includes an inner diameter (ID) sealing surface portion 177 that extends circumferentially between the mate faces 178. The sealing surface portion 177 includes a front side or seal face surface 183 that extends circumferentially between the mate faces 178. The seal face surface 183 is oriented toward the engine axis A and bounds a gas path, such as the core flow path C, when the outer air seal 169 is located in an installed position. The sealing surface portion 177 includes a backside or impingement face 189 that is opposite to the seal face surface 183. The main body 170 extends in a radial direction R between the seal face surface 183 and impingement face 189.

Each outer air seal 169 includes an engagement portion 179 that extends between the mate faces 178. The engagement portion 179 extends radially outward from the sealing surface portion 177 when in an installed position. The leading and trailing edge portions 193, 194 include the radially extending walls of the main body 170 along the sealing surface portion 177 and/or the engagement portion 179 that span between the mate faces 178.

The outer air seal 169 includes an internal cavity 184 defined by the main body 170. The internal cavity 184 extends inwardly from at least one or a pair of openings 185 along each of the respective mate faces 178 (shown in FIG. 5). In the illustrated example of FIGS. 3-8, the internal cavity 184 extends circumferentially between the mate faces 178 and is defined between the sealing surface portion 177 and the engagement portion 179.

Referring to FIGS. 6 and 7, the mounting block 180 can be arranged to secure one or more of the outer air seals 169 to a housing such as engine case 137, or to another portion of an engine static structure. An adjacent pair of outer air seals 169 are indicated as seals 169A, 169B in FIG. 7. The mounting block 180 includes at least one interface surface portion 181 extending outwardly from a main body or mounting portion 182. In the illustrated example of FIGS. 6 and 7, the mounting block 180 includes a pair of opposed interface surface portions 181A, 181B that extend in a direction predominately radially and circumferentially outward from the mounting portion 182. Each interface surface portion 181 is dimensioned to abut the engagement portion 179 of the respective seal 169 to limit relative movement in the radial and/or circumferential directions R, T, for example.

A cross section of the mounting block 180 can have a generally trapezoidal geometry, as illustrated by FIGS. 6 and 7. Surfaces of each interface surface portion 181 slope outwardly between a top 182A and bottom 182B of the mounting portion 182. The interface portions 181 can have a dovetail geometry. Each interface surface portion 181 can be inserted into or otherwise extend through a respective opening 185 to mate with ramped surfaces 186 of the internal cavity 184 (indicated as 186A, 186B in FIG. 7) to bound movement of the seal 169 relative to the mounting block 180. The dovetail geometry circumferentially overlaps with walls of the engagement portions 179A, 179B when in the installed position to secure adjacent pairs of the outer air seals 169A, 169B to the engine case 137. Ends of the interface surface portions 181 can be contoured to guide the interface surface portions 181 through one of the openings 185 and into the respective internal cavity 184 during installation. The dovetail geometry and contouring can reduce mechanical stress on the outer air seal 169, including seals made of a composite material which can be strong but relative brittle. A pair of mounting blocks 180 are insertable into respective openings 185 along the mate faces 178 to secure the outer air seal 169 to the engine static structure 136, as illustrated by seal 169A of FIG. 4.

Each interface surface portion 181 can include an outwardly extending retention feature 187. The retention feature 187 is dimensioned to abut against surfaces of the engagement portion 179 to seat the outer air seal 169 during assembly and limit circumferential and/or radial movement.

The mounting block 180 can be secured to the engine case 137 using one or more fasteners 163 (one shown in FIG. 7 for illustrative purposes). Each mounting portion 182 defines an aperture 188 that receives a respective fastener 163 to mechanically attach the mounting portion 182 to the engine case 137 and limit relative movement of one or more outer air seals 169. In the illustrated example of FIG. 7, the fastener 163 is a bolt, and the aperture 188 threadably receives a length of the bolt. In alternative examples, the fastener 163 is a clip or another structure to secure the outer air seal 169 to the engine static structure 136.

Figure 13:
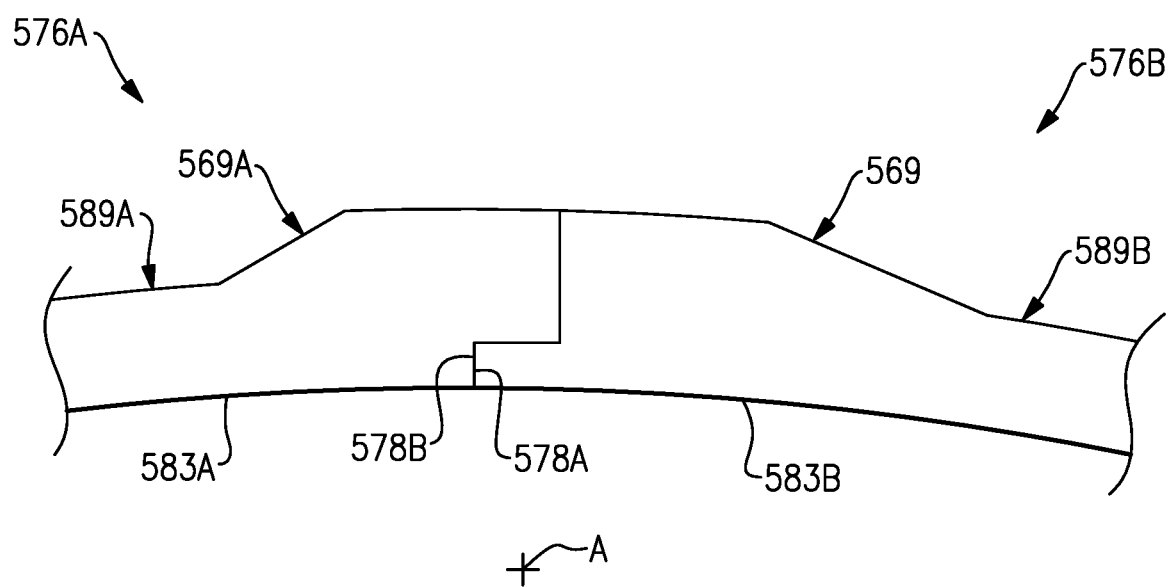
FIG. 13 illustrates adjacent seal assemblies establishing a ship lap joint according to an example.

In the illustrated example of FIG. 7, the adjacent outer air seals 169A, 169B are arranged in close proximity such that the respective mate faces 178A, 178B define an intersegment gap G that extends a distance in the circumferential direction T. In another example, referring to FIG. 13, mate faces 578A, 578B of adjacent seals 569A, 569B are dimensioned to establish a ship lap joint to substantially reduce or eliminate the intersegment gap. Now referencing back to FIG. 7, the mounting block 180 is situated between the mate faces 178A, 178B such that the mounting block 180 spans across the intersegment gap G. A portion of the fastener 163 can be circumferentially aligned with one or more of the adjacent mate faces 178A, 178B and/or the intersegment gap G. The interface surface portions 181 abut against the adjacent outer air seals 169A, 169B to support the adjacent outer air seals 169A, 169B relative to the engine case 137 and limit circumferential and/or radial movement of the adjacent outer air seals 169A, 169B relative to the engine axis A.

The mounting block 180 is arranged between the engagement portions 179A, 179B to circumferentially space apart the outer air seals 169A, 169B. Each mounting block 180 secures the engagement portions 179A, 179B to the engine case 137 when in the installed position. In alternative examples, the mounting block 180 is positioned at another location than along the intersegment gap G to secure the outer air seal 169 to the engine case 137, such as a midspan of the seal 169.

Referring back to FIGS. 3-4, with continued reference to FIGS. 5-9, the outer air seal assembly 176 defines a cooling arrangement 192 to deliver cooling flow F to portions of the outer air seal 169 and/or other portions of the outer air seal assembly 176 or components of the engine. The engine case 137 or another portion of the engine static structure 136 defines at least one or a plurality of cooling passage apertures 139. Plenum(s) 174 extend between the impingement face 189 and the engine case 137. The cooling passage apertures 139 are configured to communicate with and receive cooling flow from cooling source(s) 175.

Each of the cooling passage apertures 139 defines a respective passage axis PA that is oriented such that a projection of the passage axis PA intersects the main body 170 of the outer air seal 169. The cooling passage apertures 139 eject cooling flow F into the plenum(s) 174 and toward the main body 170 of the outer air seal 169 in a direction along the passage axis PA.

The main body 170 of the outer air seal 169 defines one or more inlet flow apertures 191 to the internal cavity 184. The inlet flow apertures 191 deliver or otherwise communicate cooling flow F from the cooling source 175 to the internal cavity 184 to cool adjacent portions of the seal 169 during engine operation. In the illustrated example of FIGS. 3-7, the impingement face 189 defines inlets of the inlet flow apertures 191 to serve as conduits to provide cooling flow F into the internal cavity 184. The inlets of the inlet flow apertures 191 may be distributed uniformly and/or non-uniformly in both and/or either the axial and/or circumferential directions X, T, for example. The inlet flow apertures 191 may vary in cross sectional area in either the axial and/or circumferential streamwise directions in order to optimize the distribution of cooling flow F, within the internal cavity 184, to achieve desired internal cavity Mach Number, Reynolds Number, and convective heat transfer, in order to tailor heat pickup and thermal cooling effectiveness requirements. Additionally the orientation and shape of the inlet flow apertures 191 may also comprise of both orthogonal and non-orthogonal apertures. In such instances the inlet flow apertures 191 may take the form of alternative geometries that may improve both thermal cooling and structural characteristics of the outer air seal 169. inlet flow apertures 191 may consist of alternate geometric shapes and sizes, which may be, but are not limited to, conical, elliptical, and/or trapezoidal shapes of constant and/or varying cross sectional flow area and/or area ratio.

One or more of the inlet flow apertures 191 can be spaced apart from each end wall of the engagement portion 179 that bounds the internal cavity 184. Each of the inlet flow apertures 191 defines an aperture axis AA (FIG. 3) such that a projection of the aperture axis AA intersects a wall of the internal cavity 184. The inlet flow apertures 191 are spaced from outlets of the cooling passage apertures 139. The inlet flow apertures 191 are substantially exposed and free of any obstructions when in an assembled position such that the inlet flow apertures 191 communicate cooling flow F to the internal cavity 184 during engine operation. Cooling flow F communicated by the inlet flow apertures 191 to the internal cavity 184 can reduce relatively sharp and/or large thermal gradients resulting in locally high thermal strains that may otherwise occur in the main body 170 due to a lack of active flow or cooling to the internal cavity 184. Reducing the potentially large radial and/or circumferential thermal gradients can mitigate detrimental thermal mechanical fatigue cracking resulting from high thermal-mechanical strains, which can improve the durability of outer air seals 169 comprising a ceramic or CMC material, for example.

The inlet flow apertures 191 can be dimensioned to meter cooling flow F from the cooling source 175 into the internal cavity 184 at a desired rate and reduce inefficiencies due to excess cooling flow F that may otherwise be communicated from the cooling source 175 to provide localized convective cooling in addition to a more optimal distribution of pressures within internal cavity 184. The ability to effectively segregate, redirect, and redistribute internal flow and pressure within internal cavity 184 can improve the utilization of available cooling flow F to achieve leakage and/or film cooling outflow requirements that may be needed to prevent ingestion and/or entrainment of the hot gases of the core flow path C. The tailoring and redistribution of cooling flow F can provide for a more efficient outer air seal 169 thermal cooling design configuration. By effectively utilizing less cooling flow F, improvements in thermodynamic cycle performance and outer air seal 169 durability capability can be achieved.

Inlet flow apertures 191 may be used to locally tailor the distribution of cooling flow F to both axial and circumferntial portions of internal cavity 184. Additionally, the local internal pressure within internal cavity 184 may be controlled and tailored to provide desired pressure ratio requirements to outlet flow apertures 197, 197" (shown in FIG. 8) and/or exposed mate faces 178 at either end of the outer air seal 169 (shown in FIG. 6) in order to prevent ingestion and/or entrainment of the hot gases in the core flow path C. It may be desirable to keep the cooling flow F active and pressurized within cavity 184 in order to prevent contaminants and other environmental particulate from depositing itself in an otherwise stagnate cavity which may adversely impact the thermal mechanical characteristics of the material properties of the outer air seal 169. Unique tailoring of the inlet flow apertures 191 also can provide additional mitigation of local hot spots and sharp thermal gradients induced by variations in both local circumferential and axial heat flux and temperature distributions along the ID sealing surface portion 177.

The inlet flow apertures 191 can have a generally elliptical cross sectional profile and extend in a radial and/or predominately radial direction R through a thickness of a wall of the main body 170. Additionally, inlet flow apertures 191 may be non-orthogonal and oriented in both a circumferential and/or axial direction. Alternative inlet flow apertures 191 geometries may be utilized either independently and/or in conjunction with, including, but not limited to, slots, conical, diffused, single or multi-lobed, shapes and/or consist of more complex geometric shapes comprising of single or multiple concave and/or convex surfaces.

Referring to FIGS. 3 and 4, the inlet flow apertures 191 can be arranged relative to the cooling passage apertures 139 to provide localized cooling to selected portions of the outer air seal 169. The projection of the passage axis PA of at least some cooling passage apertures 139 can intersect the impingement face 189 to provide localized impingement cooling, but the projection of the passage axis PA of other cooling passage apertures 139 may not. Each passage axis PA can be perpendicular or transverse to the impingement face 189 at the point of intersection (see, e.g., passage apertures 139A and 139B of FIG. 3, respectively). The passage axis PA of at least some of the cooling passage apertures 139 can be aligned with or otherwise intersect a respective one of the inlets 191 (see, e.g., passage apertures 139A) to increase an impingement distance between an outlet of the respective passage apertures 139 and the seal 169. The increased impingement distance can reduce the heat transfer augmentation, which can reduce thermal gradients and more uniformly distribute the cooling flow F in the radial direction R.

Some of the inlet flow apertures 191 can be offset from a projection of the passage axis PA of the cooling passage apertures 139, as illustrated by inlets 191' in FIG. 3 (shown in dashed lines). Offsetting the inlet flow apertures 191' allows the cooling flow F to follow along surfaces of the impingement face 189 to cool adjacent portions of the outer air seal 169 prior to entry into the inlet flow apertures 191'. Aligning some of the cooling passage apertures 139 with respective inlet flow apertures 191 but offsetting other cooling passage apertures 139 with respect to each of the inlet flow apertures 191 can provide a mixture of localized, impingement cooling to surfaces of the impingement face 189 and more direct cooling to the internal cavity 184. In examples, each inlet flow aperture 191 is aligned with a respective cooling passage apertures 139. In other examples, each inlet flow aperture 191 is offset from each cooling passage apertures 139.

The outer air seal 169 is exposed to temperature differentials between the gases in the core flow path C and the cooling flow F from the cooling source 175. Portions of the outer air seal 169 may be exposed to different thermal loads, which can result in thermal gradients across the outer air seal 169. The thermal gradients may cause cracks to form in the outer air seal 169, for example.

Referring to FIG. 8, the baffle 190 is secured to the seal 169 in at least a portion of the internal cavity 184. FIG. 3 illustrates the seal assembly 176 with the baffle 190 uninstalled in the internal cavity 184. The baffle 190 can be dimensioned to be removably inserted into the internal cavity 184. In other examples, the baffle 190 is permanently secured to in the internal cavity 184, such as by molding the baffle 190 in the main body 170, for example.

The baffle 190 divides the internal cavity 184 into a plurality of localized regions. In the illustrated example of FIG. 8, the baffle 190 divides the internal cavity 184 into at least a first region 195 and a second region 196 that is separate and distinct from the first region 195. The first region 195 serves as a cooling channel to direct or otherwise guide the cooling flow F along a perimeter of the internal cavity 184. The first region 195 can provide an increase in the max flux as well as optimized convective heat transfer coefficient (HTC) augmentation to radially inner portions of the internal cavity 184 adjacent to the seal face surface 183. The first region 195 can be established along portions of the outer air seal 169 that may be more susceptible to thermal loads or gradients, thereby establishing a prioritized cooling scheme. The prioritized cooling can reduce thermal gradients in the outer air seal 169, thereby reducing a likelihood of cracking and improving durability.

The regions 195, 196 can be dimensioned to provide localized cooling to adjacent portions of the outer air seal 169 with respect to expected heat loads and thermal gradients that may be experienced during engine operation. In some examples, the first region 195 defines a first volume, the second region 196 defines a second volume, and the first volume is less than half of the second volume. In further examples, the first volume is less than 10% or 25% of the second volume.

At least one inlet flow apertures 191 is defined along the first region 195. The inlet flow apertures 191 can be defined along the impingement face 189, for example. The first region 195 communicates cooling flow F from the inlet flow apertures 191 to one or more outlet flow apertures 197 defined by the main body 170. In the illustrated example of FIG. 8, one or more outlet flow apertures 197 (one shown for illustrative purposes) are defined along the trailing edge portion 194 of the main body 170. In some examples, the sealing surface portion 177 defines one or more outlet flow apertures 197' (shown in dashed lines) that serve as film cooling holes to eject cooling flow F from the internal cavity 184 into the core flow path C to cool adjacent surfaces of the outer air seal face surface 183. In other examples, one or more outlet flow apertures 197" (one shown for illustrative purposes) are defined along the leading edge portion 193 of the seal 169. The outlet flow apertures 197" can reduce thermal gradients across a thickness of the walls of the leading edge portion 193.

The baffle 190 is arranged in the internal cavity 184 to change a direction of the cooling flow F from the inlet flow aperture 191 relative to the respective aperture axis AA. In the illustrated example of FIGS. 8 and 9, the baffle 190 includes an elongated baffle body 190-1 having a generally C-shaped geometry. A first end 190-2 of the baffle 190 is contoured and is dimensioned to abut against surfaces of the internal cavity 184 along walls of the main body 170 that define the impingement face 189. The baffle 190 fluidly isolates the first and second regions 195, 196 along the first end 190-2. A second end 190-3 of the baffle 190 can be substantially planar. In some examples, second end 190-3' (shown in dashed lines in FIG. 9) is contoured and is dimensioned to abut against surfaces of the internal cavity 184 such that the baffle 190 fluidly isolates the first and second regions 195, 196 along the second end 190-3'.

In the illustrated example of FIGS. 8 and 9, the baffle 190 is substantially free of any impingement holes such that the first region 195 is fluidly isolated from the second region 196 between the inlet flow apertures 191 and the outlet flow apertures 197. For the purposes of this disclosure, the term "substantially free" means that less than 3% of the baffle volume defines holes. In other examples, the baffle 190 includes one or more impingement holes 199 (shown in dashed lines in FIG. 8). Although the outlet flow apertures 199 described herein are referred to as impingement holes it is to be understood that these features may consist of noncircular and cylindrical shapes, such as but not limited to, slot, elliptical, oval, race track, or other multi-faceted geometry shapes comprising of conical and/or convex surfaces.

In the illustrated example of FIG. 7, ends of the baffle 190 (shown in dashed lines) are spaced apart from walls of the internal cavity 184 such that the first region 195 and/or the second region 196 includes outlets 198 along the mate faces 178. The baffle 190 can include one or more bumpers or protrusions 190-4 (FIG. 9) such as pedestals to space apart the baffle 190 and offset it from the surfaces of the internal cavity 184, creating a gap or channel by which cooling flow F may be regulated and/or controlled and then dispersed through outlet flow apertures 197, 197' and 197" illustrated in FIG. 8.

The mounting block 180 can be dimensioned relative to surfaces of the internal cavity 184 such that cooling flow F in the internal cavity 184 can exit from the outlets 198, into openings 185 along the mate faces 178, and into the intersegment gaps G. Communication of the cooling flow F from the outlets 198 can cool portions of the mate faces 178, thereby improving durability of the outer air seals 169. Communicating the cooling flow F into each intersegment gap G creates a fluidic sealing boundary and cooling purge flow relationship to be formed, which can reduce the likelihood of ingestion of hot combustion gases from the core flow path C and into the intersegment gap G. In some examples, ends of the baffle 190 are dimensioned to abut against the walls of the internal cavity 184 such that the first region 195 is substantially fluidly isolated from the mate faces 178.

The baffle 190 can be dimensioned such that the first region 195 has a circuitous path between surfaces of the baffle 190 and walls of the main body 170 that define the internal cavity 184. The baffle 190 directs or guides the cooling flow F from the inlet flow apertures 191 along the circuitous path to provide localized cooling to adjacent portions of the main body 170.

In the illustrated example of FIG. 8, the first region 195 includes a circuitous path that follows a perimeter of the internal cavity 184. The circuitous path of the first region is defined by at least first, second and third sections 195-1, 195-2, 195-3. The baffle 190 can be arranged to establish a relatively small offset from walls of the internal cavity 184 to improve heat transfer augmentation to portions of the seal 169 adjacent to the first, second and third sections 195-1, 195-2, 195-3. For example, an offset or width W1 of the baffle 190 from surfaces of the internal cavity 184 along the first region 195 can be less than 5% or 10% of a height H and/or length L of the internal cavity 184. The relatively small offset can increase velocities of the cooling flow F along the first region 195.

The width W1 along the first region 195 can vary for each of the first, second and third sections 195-1, 195-2, 195-3. The varying offset along the first region 195 can change the Mach No. distribution of the cooling flow along the flow path to provide prioritized cooling augmentation to surfaces of the seal 169 along the first region 195. For example, width W1-1 along the first section 195-1 can be greater than width W1-2 along the second section 195-2 to cause relatively greater cooling flow F to circulate along the first section 195-1. The relatively greater width W1-1 can reduce a velocity of the cooling flow F, thereby increasing the local static pressure within the channel between the baffle 190 and the wall surfaces of internal cavity 184, along the first section 195-1, and the relatively lesser width W1-2 can the decrease a static pressure of the cooling flow F to reduce the pressure ratio across the outlet flow apertures 197, 197' for improved film cooling. The gap between the baffle 190 and the wall surfaces of internal cavity 184 may be set by altering the channel heights W1-1 and W1-2 in order to achieve the desired local cooling flow F velocity and required local static pressure to ensure sufficient driving pressure exists across outlet flow apertures 197, 197', and 197" in order to achieve the desired film cooling and backside convective heat transfer characteristics in order to reduce local temperatures, minimize thermal gradients, and increase the local film cooling performance of the out air seal 169.

The first section 195-1 extends transversely from the second and third sections 195-2, 195-3 such that a cross section of the first region 195 has a generally C-shaped geometry. The first section 195-1 has a component in the radial direction R with respect to the engine axis A, for example. The first section 195-1 extends along walls of the leading edge portion 193 that define the internal cavity 184. The baffle 190 can be situated in other orientations. For example, an orientation of the baffle 190 can be inverse to the orientation of the baffle 190 illustrated in FIG. 8 such that the first section 195-1 extends along walls of the trailing edge portion 194 that define the internal cavity 184.

The second section 195-2 has a component in the axial direction X with respect to the engine axis A, for example, such that the second section 195-2 is defined between the baffle 190 and walls of the main body 170 defining the seal face surface 183.

The third section 195-3 has a component in the axial direction X with respect to the engine axis A, for example, such that the third section 195-3 is defined between the baffle 190 and walls of the main body 170 defining the impingement face 189. The third section 195-3 fluidically connects the first section 195-1 and the inlets 191. The third section 195-3 extends along walls of the main body 170 that define the impingement face 189 such that the first region 195 at least partially surrounds the second region 196. In the illustrative example of FIG. 8, the second region 196 extends along sidewalls of the trailing edge portion 194, but is spaced apart from walls of the leading edge portion 193. A length of the third section 195-3 can be less than, equal to, or greater than a length of the second section 195-2 with respect to the axial direction X or engine axis A depending on flow, heat transfer and pressure loss requirements needed to minimize local thermal gradients while ensure positive pressure ratio and outflow conditions for outlet flow apertures 197, 197', and 197" as shown in FIG. 8). The location and number of flow apertures can be selected depending on outer air seal 169 cooling flow F allocations and durability life requirements.

The first section 195-1 fluidically connects the second section 195-2 and the inlet flow apertures 191 to deliver cooling flow F from the cooling source 175 to the second section 195-2. The second section 195-2 fluidically connects the first section 195-1 and one or more outlets 197 defined by the main body 170 to deliver the cooling flow F to downstream portions of the outer air seal 169. In some examples, the cooling flow F is ejected from outlets 198 of the first region 195 along the mate faces 178, as illustrated by FIG. 7. In the illustrated example of FIG. 8, the second end 190-3 of the baffle 190 is spaced apart from walls of the internal cavity 184 such that cooling flow F is communicated from the second section 195-2 to the second region 196 subsequent to be guided along the circuitous path established by the first region 195.

Various materials can be utilized to manufacture the outer air seal 169, mounting block 180 and baffle 190. In some examples, the outer air seal 169 is made of a first material, and the mounting block 180 and/or baffle 190 is made of a second, different material. For example, the first material can include a ceramic or ceramic matrix composite (CMC) material. The outer air seal 169 can be formed from one or more layers L of a CMC layup (FIG. 3). The outer air seal 169 can be made of another material, such as a high temperature metal, alloy, or composite material. The mounting block 180 and/or baffle 190 can be made of a second material such as a high temperature composite, metal, or alloy, such as a nickel or cobalt-based superalloy, for example. Surfaces of the baffle 190 can include one or more coatings, such as to reduce interaction between the CMC material of the outer air seal 169 and the nickel alloy material of the baffle 190. The first and second materials can differ. In other examples, the outer air seal 169 is made of a first material, and the mounting block 180 and/or baffle 190 is made of a second material that is the same as the first material, including any of the materials disclosed herein. The outer air seal 169 is formed to have a unitary construction. In alternative examples, the sealing surface portion 177 and each engagement portion 179 are separate and distinct components that are mechanically attached to one another with one or more fasteners. In some examples, the baffle 190 is made from sheet metal, or other materials with moderate temperature capability, which may include but not limited to Inconel, Cobalt-Chrome, Hastelloy, Nickel etc. and is formed to the desired geometry shape.

The inlet and outlet flow apertures 191, 197 can be formed by a machining operation after forming the main body 170. Alternatively, the inlet and outlet apertures 191, 197 can be formed during the fabrication of the main body 170 by arranging the layers L of the CMC layup (FIG. 3), for example.

A method of sealing is as follows. With reference to FIGS. 7 and 8, the baffle 190 is inserted into an opening 185 to the internal cavity 184 such that the baffle 190 is secured to the outer air seal 169. A mounting block 180 is positioned between mate faces 178A, 178B of each adjacent pair of seals 169A, 169B. Each of the interface surface portions 181A, 181B is inserted or otherwise moved in a circumferential direction T through a respective one of the openings 185A, 185B and into abutment with the ramp surfaces 186A, 186B of the engagement portions 179A, 179B to bound movement of the outer air seals 169A, 169B. Thereafter, the fastener 163 is mechanically attached or otherwise secured to the mounting block 180 to secure the outer air seal assembly 176 to the engine static structure 136.

Referring to FIGS. 3-4 and 8, with continued reference to FIG. 7, during operation of the engine, pressurized cooling flow F is communicated from the cooling source 175 to the cooling passage apertures 139. The cooling passages apertures 139 eject the cooling flow F into the plenum 174 and in a direction toward the impingement face 189 of the seal 169. The cooling flow F can be discharged from the cooling passage apertures 139 at a predetermined pressure and velocity such that the cooling flow F impinges on localized surfaces of the impingement face 189. The cooling flow F circulates from the plenum 174 and into the inlet apertures 191. The cooling flow F circulates from the inlet flow apertures 191 and disperses into the third section 195-3 of the first region 195. The cooling flow F can circulate from the inlet aperture(s) 191 to the third section 195-3, then to the first section 195-1, and then to the second section 195-2. The cooling flow F can be ejected from one or more outlets 197, 197' along the first and/or second sections 195-1, 195-2 and into the gas path such as the core flow path C. In examples, the cooling flow F circulates from the plenum 174 into the inlet flow aperture(s) 191', and then into the second region 196.

Figure 10:
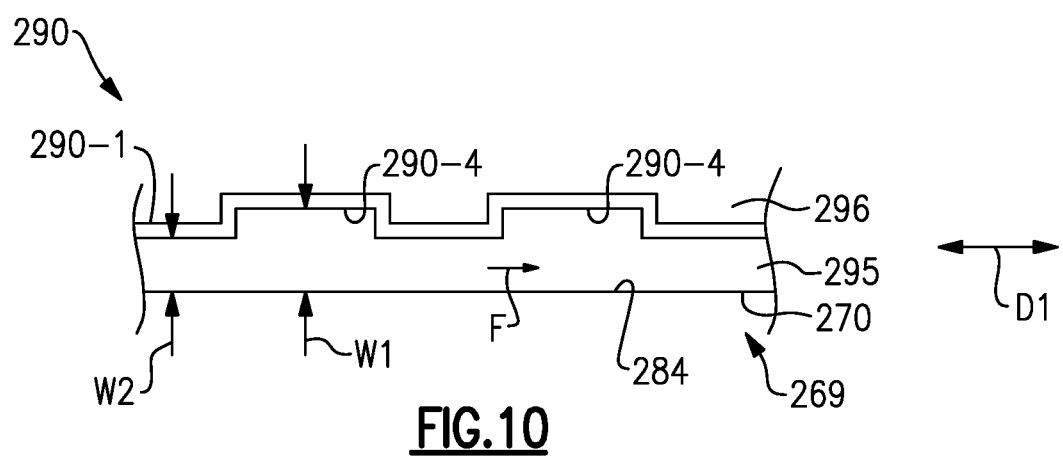
FIG. 10 illustrates a sectional view of a seal assembly according to another example.

FIG. 10 illustrates a baffle 290 according to another example. The baffle 290 can have a non-uniform offset from surfaces of the internal cavity 284. In the illustrated example of FIG. 10, walls of baffle body 290-1 are contoured such that a distance or width of first region 295 between the baffle 290 and walls of main body 270 varies at locations along the first region 295 in a first direction D1, which can be at least one of the circumferential, radial and/or axial directions T, R, X, and/or a combination thereof (see FIGS. 3-4 and 8), and wherein a passage axis of the inlet cooling aperture(s) (see, e.g., passage axis PA of FIG. 8) can be oriented orthogonally or non-orthogonally with respect to grooves 290-4 to minimize or otherwise reduce pressure losses, for example.

Figure 11:
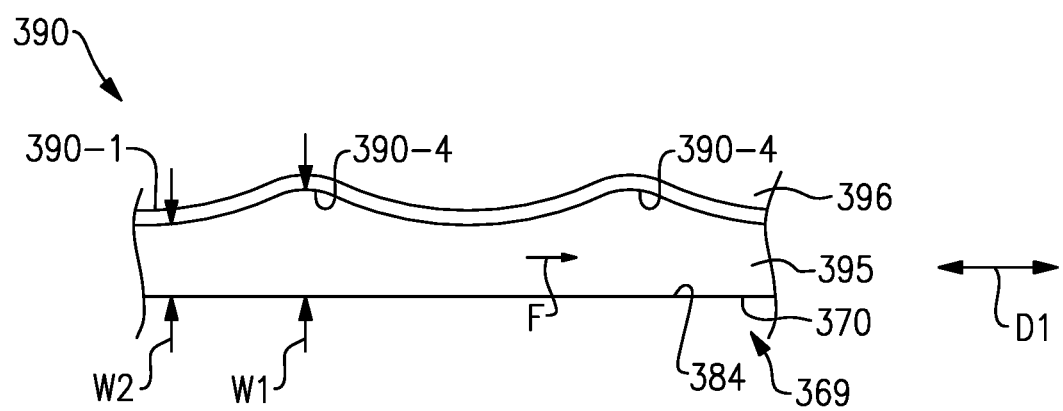
FIG. 11 illustrates a sectional view of a seal assembly according to yet another example.

The baffle body 290-1 defines one or more grooves 290-4 such that an offset or width W1 between surfaces of the grooves 290-4 and the main body 270 is greater than a width W2 between the main body 270 and other portions of the baffle body 290-1 along the first region 295. A cross section of the grooves 290-4 can have a substantially rectangular profile, as illustrated by FIG. 10. The grooves can have other geometries, such as a generally concave geometry as illustrated by grooves 390-4 of FIG. 11. The features of FIGS. 10 and 11 can be incorporated into the baffle 190 along the first, second and/or third sections 195-1, 195-2, 195-3 of the first region 195 of FIG. 8, for example. The grooves 290-4/390-4 can be circumferentially aligned with respect to injection nozzles of the combustor 56 or vanes 70 axially forward of the outer air seal 169, which may cause non-uniform thermal loads on the outer air seal 169, for example.

Figure 12:
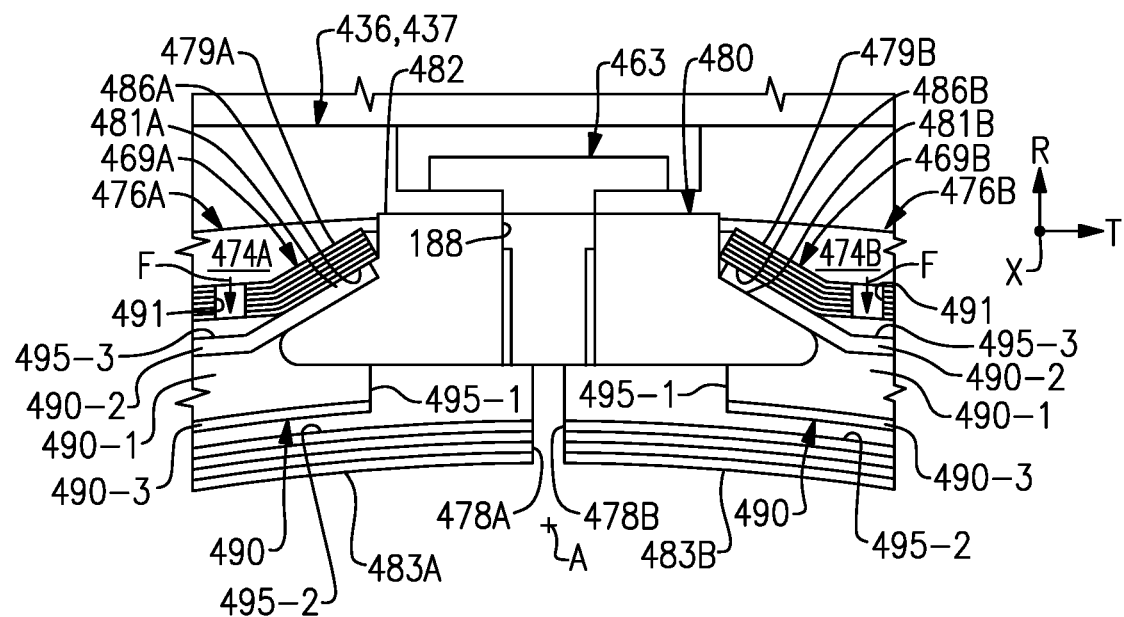
FIG. 12 illustrates a sectional view of a pair of baffles secured between a support adjacent seals.

FIG. 12 illustrates adjacent seal assemblies 476 according to another example. Two adjacent seals are labeled as 469A, 469B. Each baffle 490 is secured between a respective seal 469A/469B and surfaces of mounting block 480. In the illustrated example of FIGS. 12, baffle 490 is dimensioned such that portions of a baffle body 490-1 of the baffle 490, such as a portion of first end 490-2, are trapped between interface portions 481 of the mounting block 480 and ramped surfaces 486 of internal cavity 484 defined by the respective seal 469 that are opposed to surfaces of the respective interface portion 481 to limit relative movement in the axial, radial and/or circumferential directions X, R, T, for example.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a seal including an elongated seal body having a seal wall, an impingement wall and first and second radial walls extending in a radial direction between the seal and impingement walls, the seal wall defining a seal face that bounds a gas path, the impingement wall defining an impingement face on a side of the seal body opposite the seal face, the seal body defining an internal cavity extending in a circumferential direction between first and second mate faces circumferentially spaced apart by the first and second radial walls and extending in the radial direction between the seal and impingement walls, and the impingement wall defining at least one inlet flow aperture to the internal cavity, the at least one inlet flow aperture including a first inlet flow aperture and a second inlet flow aperture;
a baffle that divides the internal cavity into at least a first region and a second region, wherein the second inlet flow aperture is established along the second region; and
wherein the first region has a C-shaped geometry established by first, second and third sections, the third section is joined to a first end of the first section at a first bend, the second section is joined to a second end of the first section at a second bend, the first section has a major component in the radial direction such that the first section is bounded between the baffle and the first radial wall, and the second section has a major component in an axial direction such that the second section is bounded between the baffle and the seal wall, the third section has a major component in the axial direction to interconnect the first section and the first inlet flow aperture established along the third section, and the third section extends along the impingement wall such that the second and third regions are established on opposite sides of the second region and the baffle relative to the radial direction.

2. The seal assembly as recited in claim 1, wherein the first region defines a first volume, the second region defines a second volume, and the first volume is less than half of the second volume.

3. The seal assembly as recited in claim 1, wherein the second section interconnects the first section and one or more outlet flow apertures defined by the seal wall.

4. The seal assembly as recited in claim 3, wherein the baffle is substantially free of any impingement holes such that the first region is fluidly isolated from the second region between the first inlet flow aperture and the one or more outlet flow apertures along a length of the first, second and third sections.

5. The seal assembly as recited in claim 3, further comprising:
a pair of mounting blocks insertable into respective openings along the first and second mate faces to secure the seal to an engine static structure;
wherein the internal cavity extends in the circumferential direction from the first mate face to the second mate face;
wherein the seal is a blade outer air seal (BOAS);
wherein the seal is made of a first material including a ceramic material, the seal has a unitary construction, and the seal body includes a plurality of layers arranged in stacked relationship to loop around a perimeter of the internal cavity;
wherein the internal cavity is defined within and bounded in the radial direction by a thickness of the seal body;
wherein the first region at least partially surrounds the second region, and the first and second inlet flow apertures extend through the plurality of layers between opposed surfaces of the impingement face and the internal cavity; and
wherein the baffle abuts against the impingement wall.

6. The seal assembly as recited in claim 5, wherein the baffle is substantially free of any impingement holes such that the first region is fluidly isolated from the second region between the first inlet flow aperture and the one or more outlet flow apertures along a length of the first, second and third sections.

7. The seal assembly as recited in claim 6, wherein the first region includes outlet flow apertures along the first and second mate faces.

8. The seal assembly as recited in claim 1, wherein a width of the first region varies at locations along the baffle in at least one of the circumferential direction and the axial direction.

9. The seal assembly as recited in claim 1, wherein the first radial wall is established along a leading edge region of the seal body.

10. The seal assembly as recited in claim 1, further comprising a pair of mounting blocks insertable into respective openings along the first and second mate faces to secure the seal to an engine static structure.

11. The seal assembly as recited in claim 10, wherein the first region includes outlet flow apertures along the first and second mate faces.

12. The seal assembly as recited in claim 1, wherein the seal is made of a first material including a ceramic material, and the seal has a unitary construction.

13. The seal assembly as recited in claim 1, wherein the seal is a blade outer air seal (BOAS).

14. A gas turbine engine comprising:
an engine case extending along an engine axis;
an array of blades rotatable about the engine axis; and
an array of blade outer air seal assemblies distributed about the array of blades to bound a core flow path, wherein each of the seal assemblies comprises:
a seal including a seal body having a seal wall, an impingement wall and first and second radial walls extending in a radial direction between the seal and impingement walls, the seal wall defining a seal face that bounds the core flow path, the impingement wall defining an impingement face on a side of the seal body opposite the seal face, wherein the seal body defines an internal cavity extending in a circumferential direction between first and second mate faces circumferentially spaced apart by the first and second radial walls, extending in the radial direction between the seal and impingement walls and extending in an axial direction between first and second radial walls, wherein the axial, circumferential and radial directions are defined with respect to the engine axis, and wherein the impingement wall defines at least one inlet flow aperture to the internal cavity, the at least one inlet flow aperture includes a first inlet flow aperture and a second inlet flow aperture;
a baffle that divides the internal cavity into at least a first region and a second region, wherein the second inlet flow aperture is established along the second region; and
wherein the first region has a C-shaped geometry established by first, second and third sections, the third section is joined to a first end of the first section at a first bend, and the second section is joined to a second end of the first section at a second bend;
wherein the first section has a major component in the radial direction such that the first section is bounded between the baffle and the first radial wall, the second section has a major component in an axial direction such that the second section is bounded between the baffle and the seal wall, the third section has a major component in the axial direction to interconnect the first section and the first inlet flow aperture established along the third section, and the third section extends along the impingement wall such that the second and third sections are established on opposite sides of the second region and the baffle relative to the radial direction.

15. The gas turbine engine as recited in claim 14, wherein the engine case defines a plurality of cooling passages that communicate with a cooling source, each of the plurality of cooling passages defines a passage axis that is oriented such that a projection of the passage axis intersects the impingement face of the seal body, and the at least one inlet flow aperture is defined along the impingement face.

16. The gas turbine engine as recited in claim 14, further comprising:
a plurality of mounting blocks, wherein pairs of the mounting blocks are insertable into respective openings along the first and second mate faces to secure the respective seal to the engine case;
wherein the internal cavity extends in the circumferential direction from the first mate face to the second mate face;
wherein the seal is made of a first material including a ceramic material, and the seal has a unitary construction;
wherein the internal cavity is defined within and bounded in the radial direction by a thickness of the seal body; and wherein the baffle abuts against the impingement wall of the seal body to establish the third section.

17. The gas turbine engine as recited in claim 16, wherein:
the baffle has a C-shaped geometry including a first baffle portion interconnecting second and third baffle portions, the first section is bounded between the first baffle portion and the first radial wall, the second section is bounded between the second baffle portion and the seal wall, the third section is bounded between the third baffle portion and the impingement wall, the second and third sections are spaced apart from each other by the baffle, and the second region is spaced apart from the seal wall by the second section of the first region; and the third baffle portion of the baffle is trapped between the respective pair of mounting blocks and ramped surfaces of the internal cavity.

* * * * *